(12) United States Patent
Hine (10) Patent No.: US 8,764,498 B2
(45) Date of Patent: Jul. 1, 2014

(54) WAVE-POWERED DEVICE WITH ONE OR MORE TETHERS HAVING ONE OR MORE RIGID SECTIONS

(75) Inventor: Roger G. Hine, Menlo Park, CA (US)

(73) Assignee: Liquid Robotics, Inc., Sunnyvale, CA (US)

( * ) Notice: Subject to any disclaimer, the term of this patent is extended or adjusted under 35 U.S.C. 154(b) by 0 days.

(21) Appl. No.: 13/424,156

(22) Filed: Mar. 19, 2012

(65) Prior Publication Data

US 2012/0295499 A1  Nov. 22, 2012

Related U.S. Application Data

(60) Provisional application No. 61/453,871, filed on Mar. 17, 2011, provisional application No. 61/535,116, filed on Sep. 15, 2011.

(51) Int. Cl.
  *B63H 19/02* (2006.01)
(52) U.S. Cl.
  USPC .......................................................... 440/9
(58) Field of Classification Search
  USPC .......................................................... 440/9
  See application file for complete search history.

(56) References Cited

U.S. PATENT DOCUMENTS

| 986,627 | A | 3/1911 | Fischer |
|---|---|---|---|
| 1,067,113 | A | 7/1913 | Heyen |
| 1,315,267 | A | 9/1919 | White |
| 2,170,914 | A | 8/1939 | Rummler |
| 2,520,804 | A | 8/1950 | Hollar |
| 2,668,512 | A | 2/1954 | Klas |
| 3,132,322 | A | 5/1964 | Maes |
| 3,297,814 | A | 1/1967 | McClean et al. |
| 3,312,186 | A | 4/1967 | Litshiem |

(Continued)

FOREIGN PATENT DOCUMENTS

| BE | 570555 A | 9/1958 |
|---|---|---|
| CN | 1280936 A | 1/2001 |

(Continued)

OTHER PUBLICATIONS

Ageev. M., "Application of solar and wave energies for long-range autonomous underwater vehicles", Advanced Robotics, 2002, p. 43-55, vol. 16, No. 1.

(Continued)

*Primary Examiner* — Lars A Olson
*Assistant Examiner* — Jovon Hayes
(74) *Attorney, Agent, or Firm* — Kilpatrick Townsend & Stockton LLP (57) ABSTRACT

Many of the known wave-powered devices ("WPDs") comprise (1) a float, (2) a swimmer, and (3) a tether connecting the float and the swimmer. The swimmer generates thrust as the float moves up and down due to surface waves. A WPD is provided with a rigid tether that can be moved from (a) a first position ("adjacent position") in which at least a part of the tether is adjacent to the float to (b) a second position ("extended position") in which the tether (i) is extended below the float and (ii) is at least in part substantially rigid. The WPD can if desired be transported, stored, or launched while the tether is in the adjacent position, and the tether can be moved into the extended position after the device has been launched and remain in the extended position while the device is being operated.

28 Claims, 5 Drawing Sheets

(56) References Cited

U.S. PATENT DOCUMENTS

| | | | |
|---|---|---|---|
| 3,352,274 A | 11/1967 | Clakins | |
| 3,443,020 A | 5/1969 | Loshigian | |
| 3,453,981 A | 7/1969 | Gause | |
| 3,508,516 A | 4/1970 | Root | |
| 3,613,627 A | 10/1971 | Kennedy | |
| 3,760,441 A | 9/1973 | Handelman | |
| 3,828,380 A | 8/1974 | Lebovits et al. | |
| 3,845,733 A | 11/1974 | Jackman | |
| 3,859,949 A | 1/1975 | Toussaint et al. | |
| 3,860,900 A | 1/1975 | Scudder | |
| 3,872,819 A * | 3/1975 | Pickens | 440/9 |
| 3,889,045 A | 6/1975 | Logsdon | |
| 3,928,967 A | 12/1975 | Salter | |
| 3,962,982 A | 6/1976 | Pickens et al. | |
| 3,978,813 A | 9/1976 | Pickens et al. | |
| 4,134,023 A | 1/1979 | Salter | |
| 4,224,707 A * | 9/1980 | Mariani | 441/11 |
| 4,332,571 A * | 6/1982 | Jakobsen | 440/9 |
| 4,371,347 A | 2/1983 | Jakobsen | |
| 4,383,725 A | 5/1983 | Bogese et al. | |
| 4,389,843 A * | 6/1983 | Lamberti | 60/507 |
| 4,598,547 A * | 7/1986 | Danihel | 60/507 |
| 4,610,212 A | 9/1986 | Petrovich | |
| 4,638,588 A | 1/1987 | Abadie | |
| 4,673,363 A | 6/1987 | Hudson et al. | |
| 4,684,350 A | 8/1987 | DeLima | |
| 4,684,359 A | 8/1987 | Herrington | |
| 4,726,314 A | 2/1988 | Ayers | |
| 4,763,126 A | 8/1988 | Jawetz | |
| 4,842,560 A | 6/1989 | Lee | |
| 4,896,620 A | 1/1990 | Jones | |
| 4,968,273 A | 11/1990 | Momot | |
| 4,981,453 A | 1/1991 | Krishan et al. | |
| 5,050,519 A | 9/1991 | Senften | |
| 5,084,630 A | 1/1992 | Azimi | |
| 5,577,942 A | 11/1996 | Juselis | |
| 5,675,116 A | 10/1997 | Hillenbrand | |
| 5,678,504 A | 10/1997 | Toplosky et al. | |
| 5,690,014 A | 11/1997 | Larkin | |
| 5,902,163 A | 5/1999 | Barruzzi et al. | |
| 6,099,368 A | 8/2000 | Gorshkov | |
| 6,194,815 B1 | 2/2001 | Carroll | |
| 6,260,501 B1 | 7/2001 | Agnew | |
| 6,285,807 B1 | 9/2001 | Walt et al. | |
| 6,408,792 B1 | 6/2002 | Markels, Jr. | |
| 6,561,856 B1 | 5/2003 | Gorshkov | |
| 6,814,633 B1 | 11/2004 | Huang | |
| 6,908,229 B2 | 6/2005 | Landrieve et al. | |
| 6,980,228 B1 | 12/2005 | Harper | |
| 7,350,475 B2 | 4/2008 | Borgwarth et al. | |
| 7,371,136 B2 * | 5/2008 | Hine et al. | 440/9 |
| D578,463 S | 10/2008 | Tureaud et al. | |
| 7,641,524 B2 * | 1/2010 | Hine et al. | 440/9 |
| 7,955,148 B2 | 6/2011 | Corradini | |
| 8,043,133 B2 | 10/2011 | Hine et al. | |
| 8,205,570 B1 | 6/2012 | Tureaud et al. | |
| 2003/0009286 A1 | 1/2003 | Shibusawa et al. | |
| 2003/0174206 A1 | 9/2003 | Moroz | |
| 2003/0220027 A1 | 11/2003 | Gorshkov | |
| 2004/0102107 A1 | 5/2004 | Gorshkov | |
| 2004/0217597 A1 | 11/2004 | Carroll et al. | |
| 2006/0213167 A1 | 9/2006 | Koselka | |
| 2007/0051292 A1 | 3/2007 | Kilbourn et al. | |
| 2007/0173141 A1 | 7/2007 | Hine et al. | |
| 2008/0188150 A1 | 8/2008 | Hine et al. | |
| 2008/0294309 A1 | 11/2008 | Kaprielian | |
| 2008/0299843 A1 | 12/2008 | Hine et al. | |
| 2009/0107388 A1 | 4/2009 | Crowell et al. | |
| 2009/0193715 A1 | 8/2009 | Wilcox | |
| 2009/0311925 A1 | 12/2009 | Hine et al. | |
| 2010/0268390 A1 | 10/2010 | Anderson | |
| 2012/0029696 A1 | 2/2012 | Ota | |
| 2012/0029718 A1 | 2/2012 | Davis | |
| 2012/0069702 A1 | 3/2012 | Muyzert et al. | |
| 2012/0094556 A1 | 4/2012 | Hine et al. | |
| 2012/0295499 A1 * | 11/2012 | Hine | 440/9 |

FOREIGN PATENT DOCUMENTS

| | | |
|---|---|---|
| CN | 268-9229 A | 3/2005 |
| CN | 1715136 A | 1/2006 |
| DE | 10141805 A1 | 5/2002 |
| DE | 10300599 A1 | 7/2004 |
| DE | 102007053037 A1 | 5/2009 |
| EP | 1369013 A1 | 12/2003 |
| FR | 1159028 A | 6/1958 |
| FR | 2669886 A1 | 6/1992 |
| GB | 2461792 A | 1/2010 |
| JP | S 55-051697 | 4/1970 |
| JP | S 55-152698 | 11/1980 |
| JP | S 61-057488 | 3/1986 |
| JP | S 63-149289 | 6/1988 |
| JP | S 64-050199 | 3/1989 |
| TW | 221588 | 3/1994 |
| TW | 547434 | 8/2003 |
| WO | 87/04401 A1 | 7/1987 |
| WO | 94/10029 A1 | 5/1994 |
| WO | 98/39205 A1 | 9/1998 |
| WO | 98/46065 A1 | 10/1998 |
| WO | 01/42992 A1 | 6/2001 |
| WO | 2007/087197 A2 | 8/2007 |
| WO | 2008/109002 A2 | 9/2008 |
| WO | 2013/077931 A2 | 5/2013 |

OTHER PUBLICATIONS

Advanced Technology Office, "Persistent Ocean Surveillance Station-Keeping", DARPA; EXIF metadata shows image created Oct. 5, 2005, 1 page.

Anderson, B. and Padovani, B., "Towards a Comprehensive Regional Acoustic Study for Marine Mammal Distribution and Activity Regulation", A Liquid Robotics White Paper, Jan. 2012.

Clement et al., Wave energy in Europe: Current status and perspectives, Renewable and Sustainable Energy Reviews, 2002, p. 431, vol. 6, No. 5.

Communication from Japanese Patent Office on Oct. 18, 2011 on Japanese Application No. 2008-551327. [English translation].

Communication from Chinese Patent Office on Aug. 24, 2011 on Chinese Application No. CN200880006903.

Darpa, "Persistent Ocean Surveillance, Station Keeping Buoys, Program Overview", Aug. 31, 2004, 19 pages.

Department of the Navy., "ONR/MTS Buoy Workshop 2006, Persistent Unmanned Autonomous Buoy", 21 pages, believed to have been published Mar. 13, 2006.

Extended European Search Report and Opinion for EP Application No. 08726305, mailed on Jan. 15, 2013, 7 pages.

International Search Report for PCT/US2008/002743, mailed Sep. 8, 2008, 3 pages.

International Search Report and Written Opinion for PCT/US2012/029696, mailed Apr. 4, 2013, 21 pages.

International Search Report and Written Opinion for PCT/US2012/029718, mailed Dec. 21, 2012, 20 pages.

International Search Report and Written Opinion for PCT/US2012/029703, mailed Oct. 17, 2012, 14 pages.

International Search Report and Written Opinion for PCT/US2012/044729, mailed Oct. 17, 2012, 11 pages.

Joanne Masters, "Liquid Robotics Ocean Robots Embark on World Record Journey Across Pacific Ocean to Foster New Scientific Discoveries", Liquid Robotics, press release Nov. 17, 2011, 2 pages, San Francisco, CA.

Jones and Young., "Engineering a large sustainable world fishery," Environmental Conservation, 1997, p. 99-104, vol. 24.

Latt, Khine. "Persistent Ocean Surveillance—Station Keeping Buoys, Program Overview", DARPA, Aug. 31, 2004, 19 pages.

(56) References Cited

OTHER PUBLICATIONS

Lenton and Vaughan., "The radiative forcing potential of different climate geoengineering options", Atmos. Cem. Phys. Discuss., 2009, p. 2559-2608, vol. 9.
Martin, J.H and Fitzwater, S.E., "Iron Deficiency Limits Phytoplankton Growth in the north-east Pacific Subarctic", Nature, 1988, vol. 331, p. 341-343.
Martin., "Glacial-Integral CO2 Change: The Iron Hypothesis ", Paleoceanography, 1990, p. 1-13, vol. 5, No. 1.
Olson, Robert A., "Communications Architecture of the Liquid Robotics Wave Glider".
Phelps, Austin. "Wave-Powered Motor Propels Model Boat", Popular Mechanics, Aug. 1949, pp. 182-183.
Rainville, Luc. "Wirewalker: an Autonomous Wave-Powered Vertical Profiler", Aug. 19, 2001, 7 pages.
Shaw, Albert. "The American Monthly Review of Reviews—An International Magazine", vol. 19, Jan.-Jun. 1899, 2 pages.
Solomon, S. et al., "Irreversible climate change due to carbon dioxide emissions", Proc. Natl. Acad. Sci. USA, 2009, vol. 106, No. 6, p. 1704-1709.
Sparks, David. "Persistent UnManned Autonomous Buoy (PUMA)", ONR/MTS Buoy Workshop 2006, SeaLandAire Technologies, Inc., Mar. 15, 2006, Texas A&M University, College Station, 26 pages.
Wilcox, S. et al. "An autonomous mobile platform for underway surface carbon measurements in open-ocean and coastal waters", In Proceedings MTS/IEEE Oceans 2009, Biloxi, MS, Oct. 2009.
Liquid Robotics (brochure), 2011, 48 pages, retrieved from [http://liquid.com/resources/press-kit.com] on Apr. 30, 3013.
Olson, Robert A., "Communications Architecture of the Liquid Robotics Wave Glider", presented at Navigation Guidance and Control of Underwater Vehicles Conference, University of Porto, Porto, Portugal, Apr. 2012, 5 pages.
International Search Report and Written Opinion of International Application No. PCT/US2012/055797, mailed May 28, 2013, 11 pages.

* cited by examiner

WAVE-POWERED DEVICE WITH ONE OR MORE TETHERS HAVING ONE OR MORE RIGID SECTIONS

CROSS REFERENCE TO RELATED APPLICATIONS

This application claims priority from and the benefit of the following provisional patent applications:

U.S. Application No. 61/453,871, filed Mar. 17, 2011, for "Wave-Powered Vehicles (JUP 012)" (Roger G. Hine); and U.S. Application No. 61/535,116, filed Sep. 15, 2011, for "Wave-Powered Vehicles (JUP 012-0)" (Roger G. Hine).

The following three applications (including this one) are being filed contemporaneously:

U.S. application Ser. No. 13/424,156, filed Mar. 19, 2012, for "Wave-Powered Device with One or More Tethers Having One or More Rigid Sections" (Roger G. Hine); and U.S. application Ser. No. 13/424,170, filed Mar. 19, 2012, for "Wave-Powered Devices Configured for Nesting" (Roger G. Hine and Derek L. Hine); and U.S. application Ser. No. 13/424.239, filed Mar. 19, 2012, for "Autonomous Wave Powered Substance Distribution Vessels for Fertilizing Plankton, Feeding Fish, and Sequestering Carbon From The Atmosphere" (Roger G. Hine).

This application is also related to the following U.S. and International patent applications:

U.S. application Ser. No. 11/436,447, filed May 18, 2006, now U.S. Pat. No. 7,371,136;

U.S. application Ser. No. 12/082,513, filed Apr. 11, 2008, now U.S. Pat. No. 7,641,524;

U.S. application Ser. No. 12/087,961, based on PCT/US 2007/001139, filed Jan. 18, 2007, now U.S. Pat. No. 8,043,133;

International Patent Application No. PCT/US 2007/01139, filed Jan. 18, 2007, published Aug. 2, 2007, as WO 2007/087197;

International Patent Application no. PCT/US 2008/002743, filed Feb. 29, 2008, published Sep. 12, 2008, as WO 2008/109002;

U.S. application Ser. No. 61/453,862, filed Mar. 17, 2011, for "Distribution of Substances and/or Articles into Wave-Bearing Water (JUP 013)" (Roger G. Hine);

U.S. application Ser. No. 61/502,279, filed Jun. 28, 2011, for "Energy-Harvesting Water Vehicle" (Roger G. Hine);

U.S. Application No. 61/585,229, filed Jan. 10, 2012, for "Retractable Nesting Wing Racks for Wave Powered Vehicle" (Roger G. Hine and Derek L. Hine); and The U.S. and PCT applications filed on or about the same day as this application and claiming priority from one or more of U.S. Provisional Application Nos. 61/453,871, 61/453,862, and 61/535,116.

The entire disclosure of each of the above-referenced patents, applications, and publications is incorporated herein by reference for all purposes.

BACKGROUND OF THE INVENTION

This invention relates to devices that are subject to waves in the water, and that in some cases utilize the power of waves in water.

As a wave travels along the surface of water, it produces vertical motion, but no net horizontal motion, of water. The amplitude of the vertical motion decreases with depth; at a depth of about half the wavelength, there is little vertical motion. The speed of currents induced by wind also decreases sharply with depth. A number of proposals have been made to utilize wave power to do useful work. Reference may be made, for example, to U.S. Pat. Nos. 986,627, 1,315,267, 2,520,804, 3,312,186, 3,453,981, 3,508,516, 3,845,733, 3,872,819, 3,928,967, 4,332,571, 4,371,347, 4,389,843, 4,598,547, 4,684,350, 4,842,560, 4,968,273, 5,084,630, 5,577,942, 6,099,368 and 6,561,856, U.S. Publication Nos. 2003/0220027 and 2004/0102107, and International Publication Nos. WO 1987/04401 and WO 1994/10029. The entire disclosure of each of those patents and publications is incorporated herein by reference for all purposes.

Many of the known wave-powered devices ("WPDs") comprise (1) a float, (2) a swimmer, and (3) a tether connecting the float and the swimmer; the float, swimmer, and tether being such that when the vehicle is in still water, (i) the float is on or near the surface of the water, (ii) the swimmer is submerged below the float, and (iii) the tether is under tension, the swimmer comprising a fin or other wave-actuated component which, when the device is in wave-bearing water, interacts with the water to generate forces that can be used for a useful purpose, for example to move the swimmer in a direction having a horizontal component (hereinafter referred to simply as "horizontally" or "in a horizontal direction"). The terms "wing" and "fin" are used interchangeably in the art and in this application.

It is desirable to position sensors and equipment in the ocean or lakes for long periods of time without using fuel or relying on anchor lines which can be very large and difficult to maintain. In recent years, the WPDs developed by Liquid Robotics, Inc. and marketed under the registered trademark Wave Glider®, have demonstrated outstanding value, particularly because of their ability to operate autonomously. It is noted that Wave Glider® WPDs are often referred to as Wave Gliders as a shorthand terminology. It is also noted that WPDs are often referred to as wave-powered vehicles ("WPVs").

SUMMARY OF THE INVENTION

Until now, practical wave-powered devices have made use of flexible tethers. The possibility of using a rigid tether has been proposed, but has not been used in practice. A problem that arises when using a rigid tether is that it is difficult to transport, store, launch or recover a wave-powered device that has a rigid tether. Embodiments of the present invention provide a solution to this problem by making use of a tether that can be moved from (a) a first position ("adjacent position") in which at least a part of the tether is adjacent to the float to (b) a second position ("extended position") in which the tether (i) is extended below the float and (ii) is at least in part substantially rigid. The device can if desired be transported, stored, or launched while the tether is in the adjacent position, and the tether can be moved into the extended position after the device has been launched and remain in the extended position while the device is being operated. Preferably, the tether can also be moved from the extended position into the adjacent position, in which case, the device can be recovered, after a period of operation, after moving the tether into the adjacent position.

The Summary of the Invention and the Detailed Description below, and the accompanying drawings, disclose many novel features, each of which is inventive in its own right, and any one or more of which can be used in combination where this is physically possible. The different aspects of the invention identified below are no more than examples of the broad range of inventions disclosed herein.

In a first aspect of the invention, a device comprises: (1) a float; (2) a tether that is secured to the float, and that can assume multiple positions including at least (a) an adjacent position in which at least part of the tether is relatively close to the float, and (b) an extended position in which the tether (i) is extended below the float and (ii) is at least in part substantially rigid, wherein the tether can be moved from the adjacent position to the extended position; and (3) a wave-actuated component that is secured to the tether. The float, the tether, and the wave-actuated component are such that: (A) when the device is in still water and the tether is in the extended position, (i) the float is on or near the surface of the water, and (ii) the tether is submerged below the float, and (B) when the device is in wave-bearing water and the tether is in the extended position, (i) the float is on or near the surface of the water, (ii) the tether is submerged below the float, and (iii) the wave-actuated component interacts with the water to generate forces that are transmitted to the tether.

The term "substantially rigid" is used herein to denote a component which, when the tether is in the extended position and the WPD is in wave-bearing water, undergoes only elastic distortion, and preferably undergoes substantially no distortion. The invention will be described chiefly by reference to a device in which the whole of the tether, when it is in the extended position, is substantially rigid. However, the invention includes the possibility that the tether, when it is in the extended position, includes one or more parts that are not substantially rigid.

Preferably, the tether can also be moved from the extended position to the adjacent position. Preferably, the tether is substantially rigid when each is in the adjacent position; however, the invention includes the possibility that the tether become substantially rigid when it is moved from the adjacent position to the extended position.

The wave-actuated component is sometimes referred to herein as a "swimmer." It can comprise a fin system as disclosed in any of the documents incorporated herein by reference or any other mechanism that will interact with the water to generate forces that are transmitted to the tether, including the novel mechanisms disclosed in this application is.

In a first embodiment of the devices of the first aspect of the invention, the tether is in the extended position, and the device is a wave-powered device (hereinafter abbreviated to WPD). Embodiments of the invention will be described chiefly by reference to a WPD in which the forces generated by the interaction between the water and the wave-actuated component are transmitted through the tether to the float so that the float tends to move in a horizontal direction; such a device is sometimes referred to herein as a wave-powered vehicle or WPV. However, alternatively or additionally, the forces can produce some other effect on or in the tether and/or the float, e.g., the generation of electrical power.

With the tether is in the extended position, the device can become and operate as an autonomous wave-powered device (hereinafter abbreviated to WPD).

The tether can include a plurality of telescoping sections or a plurality of hinged sections. The wave-actuated component can be selected from one of the following two configurations: (A) the wave-actuated component has a single substantially rigid spine, with fins extending on each side of the rigid spine and the rigid spine, when the WPD is in still water and the tether is in the extended position, the rigid spine is at an angle of at most 40°, or at most 30°, or at most 15°, to the horizontal, e.g., substantially horizontal, and lies in a vertical plane that passes through the longitudinal axis of the float; or (B) the wave-actuated component has two substantially rigid spines, with fins extending between the rigid spines, and when the WPD is in still water and the tether is in the extended position, both the rigid spines lie in a plane at an angle of at most 40°, or at most 30°, or at most 15°, to the horizontal, e.g., substantially horizontal, and the rigid spines are equally spaced from a vertical plane that passes through the longitudinal axis of the float.

In at least some embodiments, the wave-actuated component comprises springs or other elastic components that return the fins to a neutral position. In a particular arrangement, the rotation of the fins, when the WPD is in wave-carrying water, is primarily controlled by a first spring when the rotation of the fins is within a first range about the neutral position and is primarily controlled by a second spring when the rotation of the fins is outside the first range, the second spring being stiffer than the first spring.

In at least some embodiments, there are at least two tethers that are secured to the same or different positions on the float, for example one secured to the fore section of the float and the other to the aft section of the float or both secured to the float in the same plane at right angles to the longitudinal axis of the float, at least one of the tethers being movable between a first position in which the remote end of the tether is relatively close to the float and a second position in which the remote end of the tether is relatively far from the float.

In a second embodiment of the first aspect of the devices of the invention, the tether is in the adjacent position, and the device is an assembly that can be converted into a wave-powered device by moving the tether from the adjacent position to the extended position. In the second embodiment, the assembly can for example have one or both of the following characteristics, (1) the tether is substantially parallel to the bottom of the float and/or in contact with the float over a substantial portion of the length of the tether, and (2) the wave-actuated component has a component that is substantially parallel to the bottom of the float and/or substantially parallel to the tether, and/or in contact with the tether over a substantial portion of the length of the tether. Preferably, the float, tether, and wave-actuated component are designed so that, in this embodiment, the tether and the wave-actuated component are nested closely to, and secured to, the float, thus making an assembly that remains a single unit until the time comes to launch the device on the water.

Assemblies of this type, in which the tether can be flexible or rigid when the device is in use, are described and claimed in detail in an application filed contemporaneously with this application and also claiming priority from U.S. Provisional Application Nos. 61/453,871 and 61/535,116, filed Sep. 15, 2011. Assemblies of this type provide a convenient way of transporting, storing, or launching a WPD. In some embodiments, the float includes one or more protective components, e.g., side rails, that extend downwards so that, when the tether is in the adjacent position, the tether and any wave-actuated component are above the components, thus making it possible to place the assembly on a surface with the tether and wave-actuated component separated from the surface. In other embodiments, the wave-actuated component includes one or more protective components, e.g., side rails, that extend downwards so that, when the tether is in the adjacent position, the tether and the wave-actuated component are above the protective components, thus making it possible to place the assembly on a surface with the tether and wave-actuated component separated from the surface.

In a second aspect of the invention, a method of placing a WPD as described above on water, comprises (A) placing the float of the WPD on or above the water, and (B) moving the tether from the adjacent position to the extended position either before or after the float has been placed on the water.

In a third aspect of the invention, a method of removing a WPD as described above from water in which it is floating, the WPD being a WPD which the tether can be moved from the extended position to the adjacent position, the method comprising (A) moving the tether from the extended position to the adjacent position, thus creating an assembly as described above, and (B) removing the assembly from the water.

In a fourth aspect of the invention, an assembly comprises a float and a tether, at least a part of which is substantially rigid and that is secured to the float by a connection that enables the tether to be moved from (a) a first adjacent position in which at least part of the tether is relatively close to the float to (b) a second extended position in which the tether is extended below the float.

In a fifth aspect of the invention, a float suitable for use in a WPD as described above comprises a connection to which a substantially rigid tether can be secured and that enables a substantially rigid tether secured to the connection to be moved between the adjacent and extended positions.

In a sixth aspect of the invention, an assembly comprises a substantially rigid tether and a wave-actuated component secured to one end of the tether, the wave-actuated component comprising a rigid spine having fins mounted at spaced intervals along the spine.

In a seventh aspect of invention, a wave-powered device that comprises (1) a float, and (2) a wave-actuated component, where the float and the wave-actuated component are such that, when the device is in still water, (i) the float is on or near the surface of the water, and (ii) the wave-actuated component is submerged below the float, wherein the wave-actuated component comprises an elongate rigid member that is directly connected to the float and extends downwards from the float.

In an eighth aspect of invention, a method of obtaining information comprises receiving signals from, or recorded by, a WPD as described above.

In an ninth aspect of invention, a method for controlling a function of a WPD as described above comprises sending signals to the WPD.

Embodiments of the wave-actuated component can use a fin control system wherein the angular movement of at least one fin is primarily controlled by a first spring or other means when the movement of the fins is within a first range about a neutral position and is primarily controlled by a second spring or other means when the movement of the fins is within a second range that is outside the first range. The second spring is stiffer than the first spring, thus making it more difficult for the fins to move within the second range.

Within the second range, the movement can be controlled solely by the second spring or by a combination of the first spring and the second spring.

The system can include a stop that prevents the first spring from moving beyond a first limit. The system can include a stop that prevents the second spring from moving beyond a second limit, and thus prevents the fin from moving outside a second range. Either or both of the springs can be replaced by an equivalent means that may be mechanical or electromechanical. When using such a system, when the waves in the wave bearing water are small, the rotation of the fins is controlled by the first spring and only a little fluid force is needed to rotate the fins to an angle within an effective range. As the waves become larger, the second spring comes into play and, by preventing the fins from "overrotating" maintains the fins at an angle within an effective range. Excessive water forces can rotate the fin so that it dumps the load, thus protecting the system from overload.

In a specific embodiment of the fin control system, a first spring is fixed on one end to the fin and on the other end to the side beam (rigid spine), via the first spring stop. As the fin rotates around the shaft, the first spring torques the fin back to a neutral position level with the side beam. A second spring is fixed on one end to the wing and on the other end rotates freely between an upper and lower stop. Only motion beyond the stop pin is resisted by the second spring. The combined result is a soft spring for motion around the neutral, level position, and stiff spring for motion beyond the stops. In light waves only a little fluid force applied the fins can rotate the wings to an effective angle of attack. As fluid force increases in rougher wave conditions, effective angle of attack is maintained. Very high fluid forces can rotate the fin to so that it dumps the load and is thus the system is protected from overload.

Many of the embodiments have on-board electronics, including (1) wireless communications equipment, (2) a computer system, (3) a satellite-referenced position sensor, (4) a sensor that senses direction in a horizontal plane, and (5) a steering actuator. The computer system (a) is linked to the communications equipment, the position sensor, the horizontal sensor and the steering actuator, and (b) contains, or is programmable to contain, instructions to control the steering actuator in response to signals received from the communications equipment, or from the position sensor and the horizontal sensor, or from signals received from another sensor on the vehicle.

A further understanding of the nature and advantages of the present invention may be realized by reference to the remaining portions of the specification and the drawings, which are intended to be exemplary and not limiting.

DESCRIPTION OF SPECIFIC EMBODIMENTS

Overview

Figure 1:
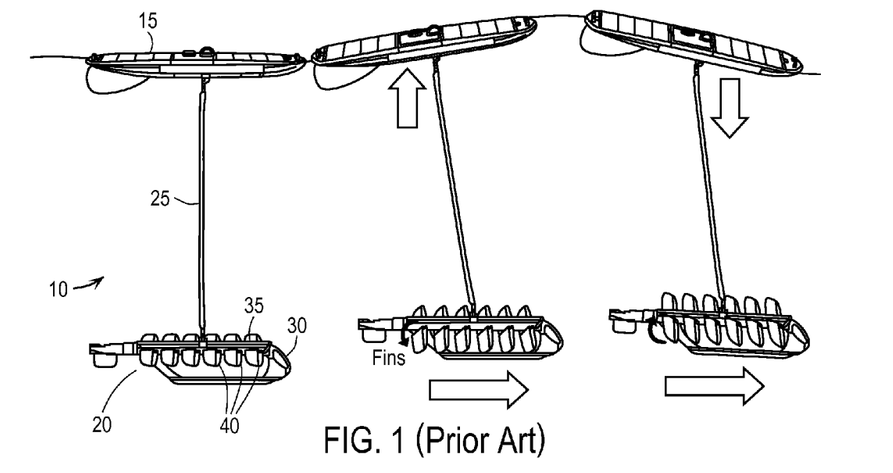
FIG. 1 is a pictorial view showing the operation of a wave-powered device ("WPD") in still water (fins/wings in neutral position), when a wave lifts the float (up-stroke), and when the WPD sinks into the wave trough (down-stroke)

FIG. 1 is a pictorial view showing the operation of a wave-powered device ("WPD") 10. This is an example of a prior art WPD developed by Liquid Robotics, Inc. and marketed under the registered trademark Wave Glider®. In short, WPD 10, as additional embodiments described below, converts wave motion into forward thrust, and uses satellite location systems and radio to communicate data back to an operator and to receive navigation and other commands. It has on-board computers and sensors that allow it to navigate or hold position autonomously, without regular human interaction or control.

WPD 10 includes a float 15, a submerged swimmer 20, and a flexible tether 25. The swimmer includes a frame 30 having a central rigid spine portion 35 to which a number of wings or fins 40 are pivotally mounted for rotation about respective normally horizontal axes. As waves lift and lower float 15 of the WPD, fins 40 on the submerged portion (swimmer 20) passively rotate so as to convert the relative motion of the surrounding water into forward thrust. The azimuth of the thrust vector can be directed completely independently of the direction of the waves by a rudder at the back of the glider.

FIG. 1 contains three portions, from left to right showing the WPD in still water (fins/wings in neutral position), when a wave lifts the float (up-stroke), and when the WPD sinks into the wave trough (down-stroke). In still water (lefthand portion of FIG. 1), the submerged swimmer hangs level directly below the float. As the wave lifts the float (middle portion of FIG. 1), the float pulls the swimmer upward through the water. Each fin is rotated so that as the glider moves up, the fins generate thrust. As the float sinks into the wave trough (righthand portion of FIG. 1), the swimmer is lowered as well. The wings rotate so that the swimmer dives forward again. Both the up and down strokes generate forward thrust.

The swimmer is the component that generates forward thrust as the fins are pulled up and down by wave action. The fins are the actual elements that are actuated by the water, but it can be to view the swimmer as the wave-actuated component of the WPD. A significant use of the WPD is as a vehicle where the forces generated by the fins interacting with the wave-bearing water are used to move the swimmer in a direction having a horizontal component (hereinafter referred to simply as "horizontally" or "in a horizontal direction"). These forces, however, can be used for other purposes (e.g., power generation).

Single Rigid Tether Embodiment

Figures 2A, 2B, 2C:
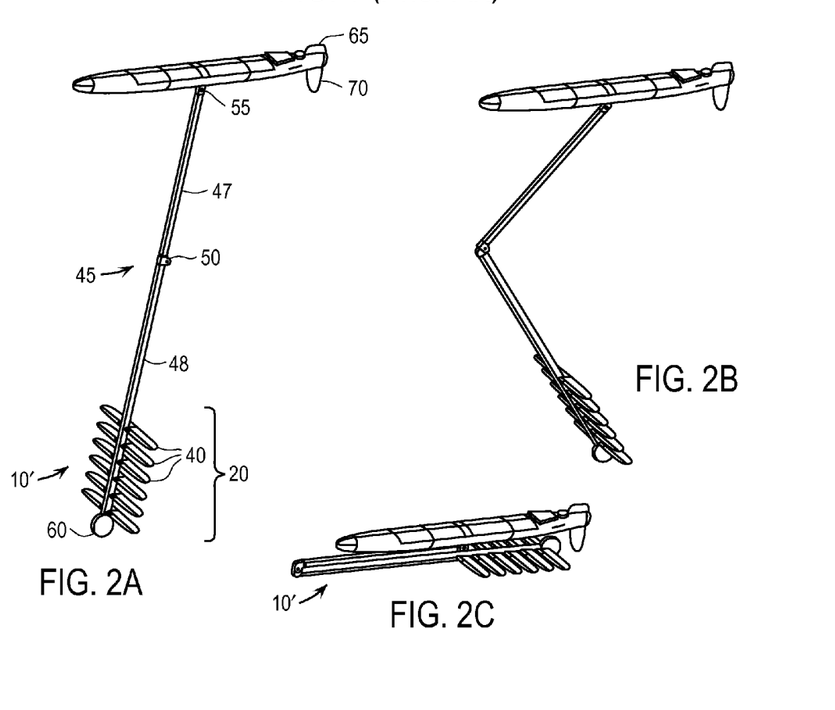
FIGS. 2A, 2B, and 2C show a WPD with a rigid tether and a wave-actuated component having a rigid spine to which fins are attached at spaced apart-intervals, with FIG. 2A showing the tether fully extended in a swimming position, FIG. 2B showing the rigid tether partially retracted, and FIG. 2C showing the rigid tether fully refracted so that the WPD is in a bundle configuration suitable for launch or recovery.

FIGS. 2A, 2B, and 2C show a WPD 10' that differs from WPD 10 above in that the tether, represented by reference number 45, is rigid rather than flexible. Despite the problems with rigid tethers discussed above, rigid tethers can provide advantages. For example, when the float descends, a rigid tether can push on the swimmer, rather than relying on the swimmer's weight to lower it to provide thrust (thus allowing the weight of the float to do useful work). Also, it eliminates the occurrence of slack in the tether, which can result in large snap loads when the slack is removed. Additionally, depending on the connection, a rigid tether can allow torque to be transmitted between the float and the swimmer such that steering alignment can be maintained, and tether twists are not possible.

While some rigid tether embodiments consist of a single rigid section without intermediate joints, in the illustrated embodiment, tether 45 has two rigid sections, upper and lower sections 47 and 48 connected at an intermediate joint 50. Upper rigid section 47 is secured to the float through an upper joint 55 such that the upper rigid section can be in a first operating position ("extended position") in which the upper rigid section extends away from the float, or in a second folded position ("adjacent position") in which the rigid section is relatively close to the float, e.g., adjacent to the bottom of the float.

FIG. 2A shows the tether fully extended in a swimming position. In this particular embodiment, swimmer 20 is rigidly attached to lower section 48 so that the swimmer rigid spine portion 35 remains generally vertical and fins 40 are disposed in a vertical array. This differs from the embodiment shown in FIG. 1 where the rigid spine is generally horizontal and the fins are disposed in a horizontal array. A weight 60 at the bottom of the tether/swimmer helps stabilize the tether, and the entire WPD in the vertical orientation.

When the WPD is floating in still water, and the rigid section is in the first operating position, the upper rigid section preferably lies (i) in a first plane that includes the longitudinal axis of the float and that is substantially vertical, and (ii) in a second plane that is orthogonal to the first plane and that is at an angle of at most 30°, or at most 15°, particularly at most 5°, e.g., substantially 0°, to the vertical. In one embodiment, the upper rigid section is hinged at or near the point at which it is attached to the float so that the upper rigid section, when it is in the operating position, can pivot forward and backwards relative to the float when the WPD is in wave-bearing water, and/or so that it can move between the extended and adjacent positions. Upper joint 55, which is between substantially rigid section 47 and the float, can be one that can be controlled, e.g., locked in the operating position and/or the folded position, for example manually or through a control mechanism, e.g., gears, operated remotely, e.g., by a winch or other mechanical or electromechanical mechanism mounted on the float.

Intermediate joint 50 is preferably configured so that it is possible for the sections to be in a first operating position in which the sections are substantially aligned, with both sections, preferably lying in a first plane and a second plane as described above, or in a second folded position in which both sections are relatively close to the float, e.g., adjacent to the bottom of the float. Joint 50, which is between the two sections, can be one that can be controlled, e.g., locked in the operating position and/or the folded position, for example manually or through a control mechanism, e.g., gears, operated remotely, e.g., by a winch or other mechanical or electromechanical mechanism mounted on the float.

FIG. 2B shows rigid tether 45 partially retracted with the two sections 47 and 48 partially folded toward each other at joint 50. FIG. 2C shows the rigid tether fully retracted, that is with tether sections 47 and 48 fully folded toward each other, and the upper section completely folded so that the WPD is in a bundle configuration suitable for launch or recovery. A lift eye 65 is provided on the top of the float at the aft end to facilitate recovery. Although not shown, the swimmer could also be provide with a lift section or pickup point, to which a line can be secured to enable the swimmer to be pulled upwards, so that the rigid section can be moved from the operating position to the folded position. The float and/or swimmer may also deploy a line with floats to enable easier recovery. A person on a recovery ship may throw a grapnel over the line and floats and then pull the bundle in.

Figure 3:
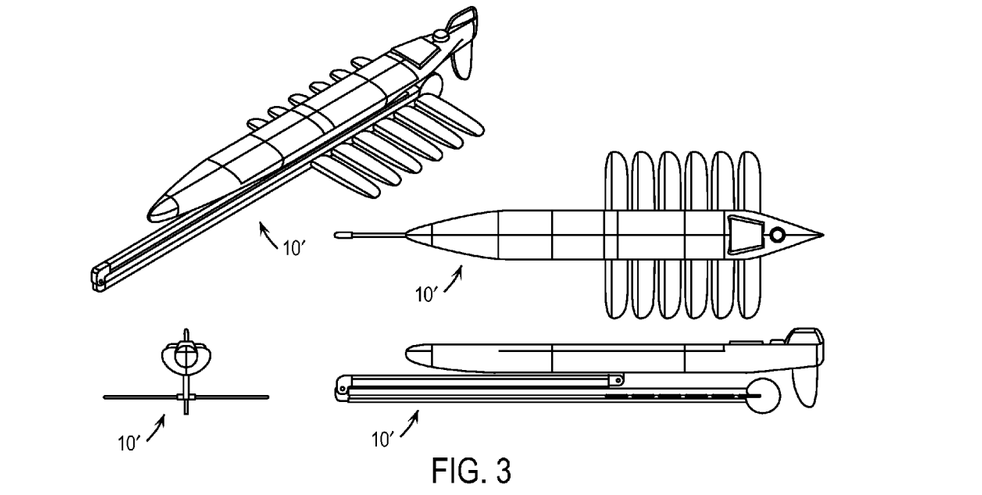
FIG. 3 contains perspective, top, front, and side views of the WPD of FIGS. 2A, 2B, and 2C in the bundled configuration.

FIG. 3 contains perspective, top, front, and side views of the WPD of FIGS. 2A, 2B, and 2C in the bundled configuration.

The float can have solar panels and antennas (not explicitly shown), and a rudder 70 at the aft end that is actively steered. The folding mechanism for the rigid tether may be actuated by a cable and winch in the float, or by a worm gear drive, or by various other mechanisms. When in bundled position, the weight or rigid pole may latch into the float, to reduce stress on the folding mechanism during transport or handling. This latch may be automatically released for deployment.

Figure 4A:
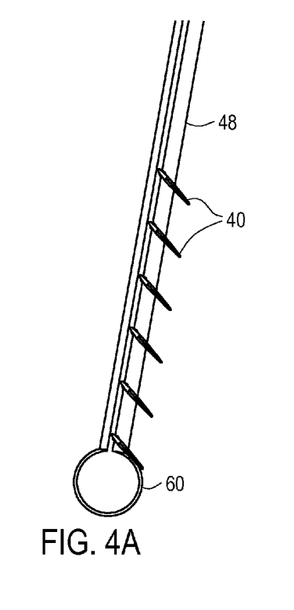
FIGS. 4A, 4B, and 4C respectively show the wings of the WPD of FIGS. 2A, 2B, and 2C in an up-stroke position, in a neutral position, and in a down-stroke position as the WPD moves up and down in wave-bearing water.
Figure 4B:
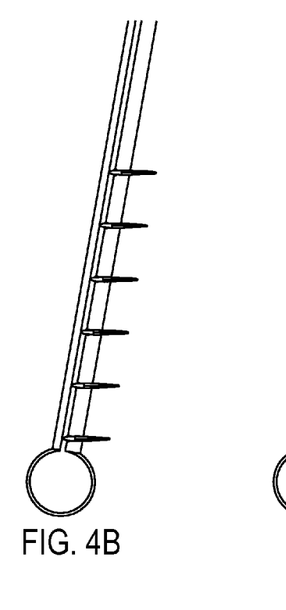
Figure 4C:
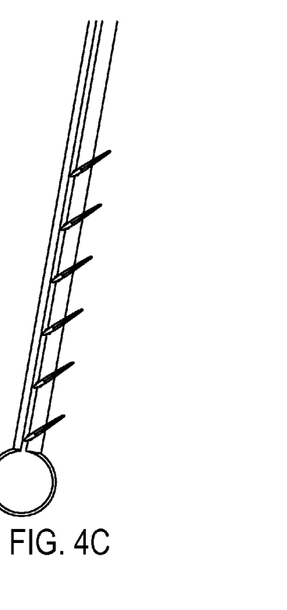

FIGS. 4A, 4B, and 4C respectively show show the WPD's fins at three different angles, in an up-stroke position, in a neutral position, and in a down-stroke position. The fins pivot along a pitch axis (an axis perpendicular to the vertical axis and perpendicular to the forward motion axis). Spring force may return the fin to a neutral position where it is roughly level. Alternatively, the fin may be balanced so that gravity returns it to this position. When moved up relative to the surrounding water, the fins rotate to the configuration of FIG. 4A and generate thrust. When moved down relative to the surrounding water, the fins rotate to the configuration of FIG. 4C, and generate thrust. Weight 60 at the bottom of the tether helps stabilize the pole, and the entire vehicle in the vertical orientation.

An alternative to the tether with folding rigid sections described above is to have telescoping rigid sections. Two or more substantially rigid sections are telescoped to each other so that the sections can be in a first operating position in which the sections are extended from each other, or in a second telescoped position in which the sections are nested together. Preferably, there is a control mechanism such that the sections can be locked, either manually or through a remote control, either in the operating position or the telescoped position. For example, the telescoping of the sections can be controlled by gears that can be operated by means of a winch or other control mechanism mounted on the float. It is contemplated that the sections would be telescoped together before the telescoped tether would be folded toward the bottom of the float.

The swimmer (wave-actuated component) embodiment illustrated above in connection with WPD 10' had substantially rigid spine 35 rigidly mounted to lower tether section 48 and generally aligned with it. In this embodiment, the substantially rigid spine can be at an angle of at most 40°, or at most 30°, or at most 15°, to the vertical, e.g., substantially vertical; in this case, the fins can, for example, be mounted on the spine and lie one above the other in a substantially vertical plane, pivoting around a pitch axis (an axis perpendicular to the vertical axis and perpendicular to the forward motion axis).

Alternatively, the substantially rigid spine can be connected to a substantially rigid section of the tether through a connection that, when the WPD is operating in wave-bearing water, is substantially rigid, but generally extending away from the axis of the tether. The substantially rigid spine of the swimmer, when the WPD is operating in wave-bearing water, can be at an angle of at most 40°, or at most 30°, or at most 15°, to the horizontal, e.g., substantially horizontal; in this case, the fins can, for example, be mounted on the spine and lie side-by-side in a substantially horizontal plane. In either of these alternatives, the joint between the tether and the swimmer can be a fixed joint such that the spatial relationship between the tether and the swimmer is fixed or it can be a joint that permits the swimmer to move relative to the tether.

Multiple e.g., Dual Rigid Tether Embodiment

Figure 5A:
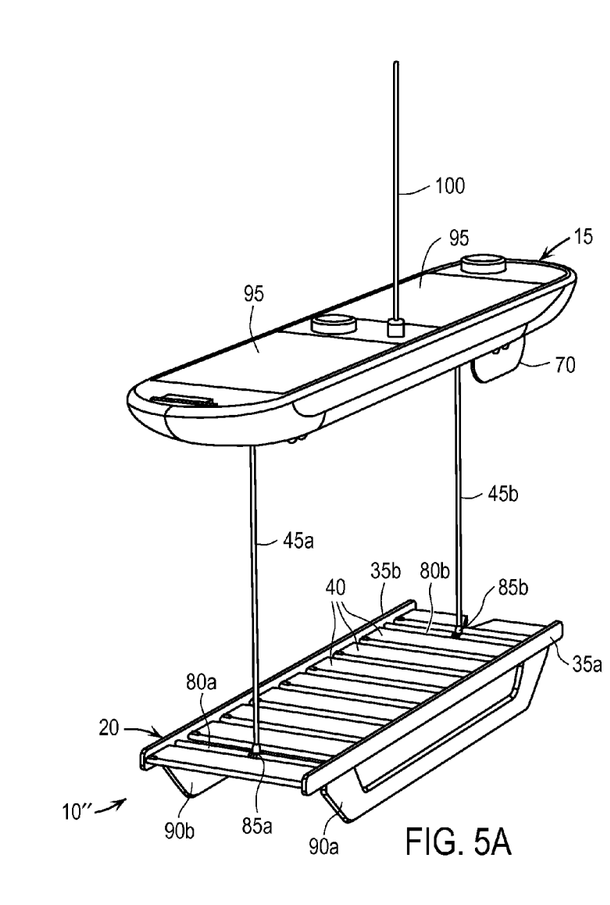
FIG. 5A is a perspective view of a WPD having two rigid tethers and a wave-actuated component having two horizontal rigid spines (side beams) and a fin system between the rigid spines, with the tethers in their extended positions.

FIG. 5A is a perspective view of a WPD 10" having fore and aft rigid tethers 45a and 45b coupled between float 15 and swimmer 20. The two rigid tethers are provided with folding or telescoping mechanisms similar to those described above in connection with the single-tether WPD 10' shown in FIGS. 2A, 2B, 2C, and 3. In this view, the tethers are in their respective extended positions.

In this embodiment, the swimmer has two rigid spines 35a and 35b that define the side beams of a rectangular frame having fore and aft transverse crossbars 80a and 80b. The fins 40 are mounted between the side beams, and the lower ends of the fore and aft tethers are attached to the crossbars by fore and aft connectors 85a and 85b. The upper ends of the tethers are attached to float 10" at fore and aft locations of the bottom of float by respective connectors (hidden from view). The frame also includes bottom runners 90a and 90b that extend below the fins and the side beams. Thus, when the swimmer is placed upon a horizontal surface, the runners separate the horizontal surface from any part of the swimmer that might otherwise be damaged by contact with the surface. This figure shows float 15 as having solar panels 95 and an antenna 100 between the solar panels. The floats of the other WPDs described above typically also include solar panels and one or more antennas, but those were omitted for clarity.

Figure 5B:
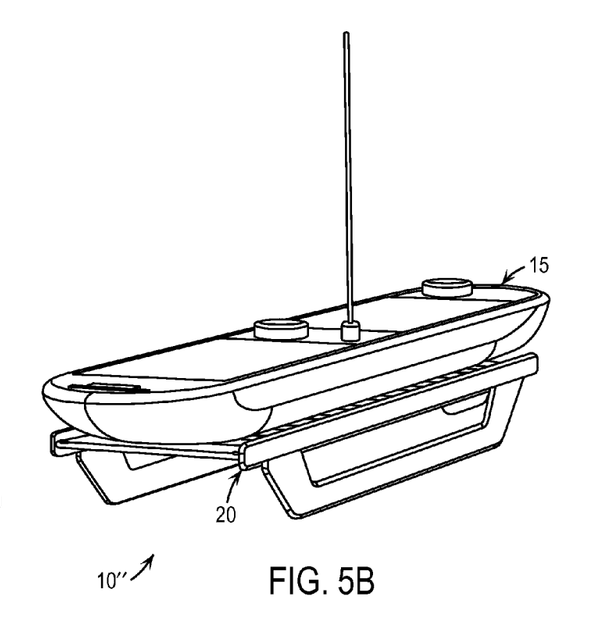
FIG. 5B is a perspective view of the WPD of FIG. 5A with the rigid tethers in their retracted positions so that the WPD is in a bundle configuration with the float sitting atop the wave-actuated component.

FIG. 5B is a perspective view of the WPD of FIG. 5A with the rigid tethers in their retracted (adjacent) positions so that the WPD is in a bundle configuration with the float sitting atop the swimmer. Again, the ability to fold or telescope the tethers and fold the retracted tethers against the bottom of the float addresses and solves the previously mentioned problems with rigid tethers. The use of multiple tethers can provide other advantages.

The use of dual tethers can reduce the likelihood that the tethers will become twisted; can enable a longer and narrower float shape (which reduces drag and increases speed); and by moving the connections and mechanisms associated with the tether to the fore and aft sections of the float, makes it possible to provide a larger central area of the float for payloads of all kinds, for example communications equipment and sensors and other scientific instruments. In addition, the use of two tethers can simplify recovery of a WPD. Recovering a WPD which has only a single tether can be difficult because pulling up on the single tether after lifting the float out of the water requires lifting the swimmer against the resistance of the fins to the water. When there are two tethers, pulling on only one of the tethers tilts the swimmer and the fins attached to it so that the resistance of the fins is reduced. This can be accomplished by tilting the float, or differentially retracting the rigid tethers so that the swimmer is no longer parallel to the float.

A WPD having a single tether generally has a tether termination assembly and load distribution structure at the center of the float, thus occupying the center of the float. The use of two spaced-apart tethers frees up the center of float, which for many purposes is the most valuable part of the float for desired components. For example, the best part of the float for tall antennas is the center, where they can cast a shadow on at most half of solar panels mounted on the upper surface of the float (shading just part of a solar panel can completely disable it if, as is often the case, the cells are wired in series and shut off like transistors when dark.) Also, tall antennas have no steering effect on the float due to wind if they are at the center. When the WPD has two tethers, the center area of the float may be free for payloads with integrated antennas, i.e., antennas which are integrated with a dry box, or kept entirely within a dry area, thus reducing the danger that routing wires to the antennas will be damaged by moisture. In addition, placing most or all of the payload at the center of float makes it easier to balance the float fore and aft, and thus reduces the danger that the float will nose in or nose up.

When the WPD has two tethers, the float preferably contains a means to steer the float, such as rudder 70 at the tail end of the float. The wave-actuated component (swimmer) provides thrust as it is lifted and lowered due to wave action. Torque from the float is transmitted to the wave-actuated component by the separation of the two tethers. The wave-actuated component thus points in the same direction as the float after a steering lag, caused by the inertia and fluid resistance to rotation of the wave-actuated component. In some applications, this can obviate the need for a rudder on the swimmer, possibly eliminating the need to run electrical wires down the inside of the tether.

The rigid tethers hold the swimmer parallel with the float. Particularly when the swimmer is held relatively level, a spring and stop system can control the angle of fins well, so that the fins operate at a favorable angle of attack during up and down motions with various speeds and amplitudes. The above-illustrated and described parallel bar structure with fin support shafts crossing between bars like ladder steps facilitates this. The position of the fins can, for example, be controlled by a spring assembly which maintains the fins at a desired neutral position, e.g., a level position, when the springs are not moving and which will resist upward and downward motion. The spring profile may be adjusted so that the wings tend to stop at an angle that is optimized for maximum lift.

While specific dimensions are not required to exploit the invention, examples will be given for completeness. For example:

The horizontal distance between the front of the float and the fore tether connection location on the float can be at most 0.3 times, preferably at most 0.2 times, e.g., 0.05-0.15 times, the horizontal length of the float.

The horizontal distance between the rear of the float and the aft tether connection location on the float can be at most 0.3 times, preferably at most 0.2 times, e.g., 0.05-0.15 times, the horizontal length of the float.

The horizontal distance between the front of the swimmer and the fore tether connection location on the swimmer can be at most 0.3 times, preferably at most 0.2 times, e.g., 0.05-0.15 times, the horizontal length of the swimmer.

The horizontal distance between the rear of the swimmer and the aft tether connection location on the swimmer can be at most 0.3 times, preferably at most 0.2 times, e.g., 0.05-0.15 times, the horizontal length of the swimmer.

Spring Arrangement for Controlling Wing Rotation with Gradations of Torque

Figure 6:
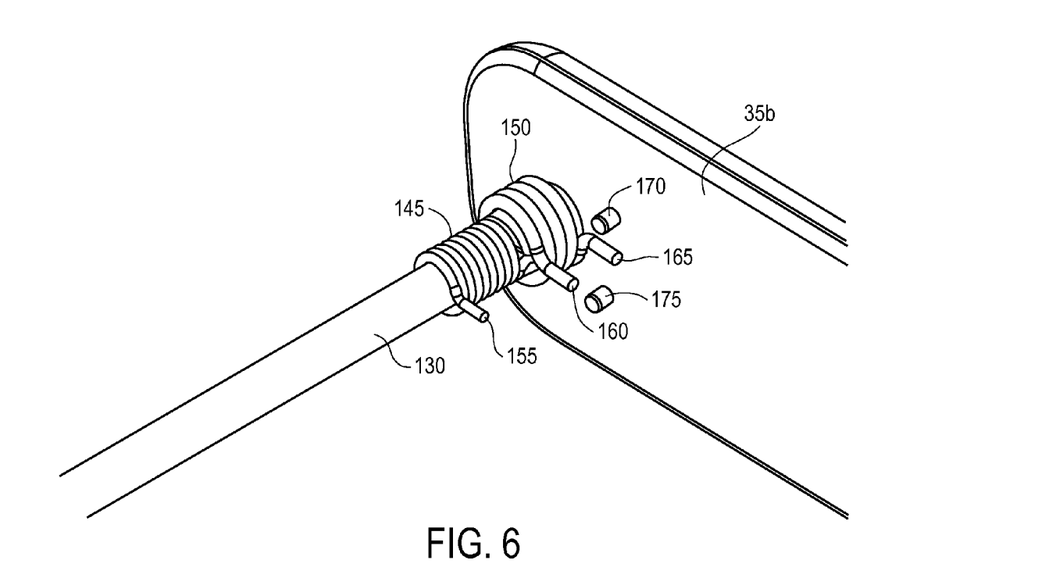
FIG. 6 is a perspective view showing a two-spring arrangement for controlling the movement of a fin (not shown), which is part of a wave-actuated component such as that of the WPD of FIGS. 5A and 5B, viewed looking from between the spines (side beams)
Figure 7:
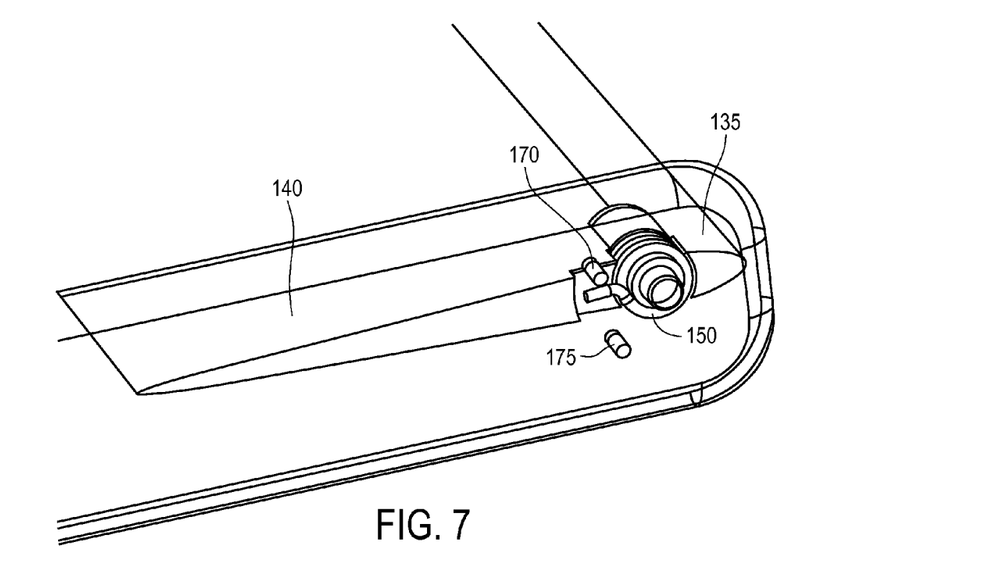
FIG. 7 is a partially cutaway perspective view showing the two-spring arrangement with one end of each spring embedded in the fin, viewed looking from outside the spines (side beams)

FIG. 6 is a perspective view showing a two-spring arrangement for controlling the movement of a fin (not shown), which is part of a wave-actuated component such as that of the WPD of FIGS. 5A and 5B, viewed looking from between the spines (side beams). FIG. 7 is a partially cutaway perspective view showing the two-spring arrangement with one end of each spring embedded in the fin, viewed looking from outside the spines (side beams).

The spring arrangement constrains upward and downward rotation of the fins within two ranges requiring increasing torque. FIG. 6 is an upper perspective of the spring arrangement on the foremost fin to the right side beam 35b from behind on the inside, with the fin removed. FIG. 7 is an upper perspective of the same spring arrangement from behind on the outside, with the beam drawn transparently and showing a portion of the fin.

The fin is rotationally mounted to the side beam 35b by way of an axle 130 that passes transversely through the fin 40 just behind the leading edge 135 with the elevator portion of the fin 140 extending behind. The spring arrangement comprises first and second springs 145 and 150. The first spring is wound around the axle 40 (shown in this example on the inside of the side beam 35b). The first spring 145 extends from the axle at one end 155 to form a hook portion disposed to provide a point of attachment for the fin. In this embodiment, the other end of the first spring, not shown, is fixed to the side beam.

The second spring 150 is also wound around the axle 130 in the same direction as the first spring 145. In this example, the second spring is thicker, and therefore stiffer, than the first spring. The second spring 150 extends from the axle at one end 160 to form a hook portion disposed to provide a point of attachment for the fin. The second spring 150 extends from the axle at the other end 165 to form a hook portion disposed to travel between an upper stop 170 and a lower stop 175 mounted on the side beam 35b.

With this configuration, the first spring 145 is engaged to control the upward an downward rotational movement of the fin but the second spring is not—as long as the movement is within the range defined by the stops for the second spring. When the rotation of the fin goes beyond what is permitted by the stops, then the second spring 150 becomes engaged by encountering the upper or lower stop, depending on the direction of rotation. As a consequence, the torque required to rotate the fin is now determined by both the first spring and the engaged coil of the second spring. Thus more torque is required to rotate the fin further in the same direction.

Figure 8:
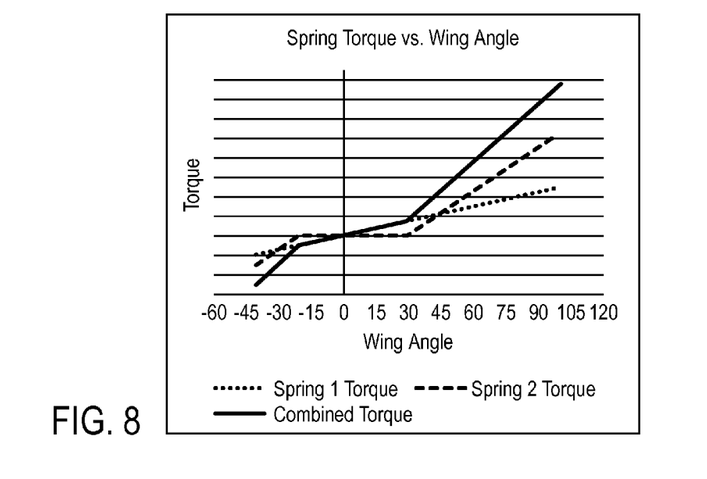
FIG. 8 is a graph of spring torque as a function of fin (wing) angle.

FIG. 8 is a graph of spring torque as a function of fin (wing) angle. This is the torque required to alter the angle of a fin of the vehicle in either direction from a neutral position. The torque required to operate the fin within the inner range is determined by the first spring alone, beyond which the torque required to alter the angle in either direction is determined by the combined torque of both springs.

Specific Embodiments and Configurations

In one embodiment this invention provides a WPD that comprises a tether that will resist compression, and that also has at least one of the following features (i.e., which has one of the following features or a combination of any two or more of the following features):

When the substantially rigid spine is at an angle of most 40°, or at most 30°, or at most 15°, to the vertical, e.g., is substantially vertical, the substantially rigid spine of the swimmer and the substantially rigid section of the tether can optionally be a single monolithic component, with the substantially rigid spine and a substantially rigid section optionally being substantially aligned. In this case, the swimmer can comprise an additional weight, which helps to maintain the swimmer in a desired, e.g., substantially vertical, orientation.

In one embodiment, the tether can for example consist essentially of a single substantially rigid section having one end secured to the substantially rigid spine of the swimmer and the other end secured to the float, for example through a joint as described in (1) above. In another embodiment, the tether can for example consist essentially of first and second substantially rigid sections; the first substantially rigid section having one end secured to the substantially rigid spine of the swimmer and the other end secured to the second substantially rigid section, for example through a joint as described in (1) above; and the second substantially rigid section having one end secured to the first substantially rigid section, and the other end secured to the float, for example through a joint as described in (1) above.

The wave-actuated component (swimmer) comprises a substantially rigid spine having fins secured thereto, and the substantially rigid spine is connected to a substantially rigid section of the tether through a connection which, when the WPD is operating in wave-bearing water, is substantially rigid. The substantially rigid spine of the swimmer, when the WPD is operating in wave-bearing water, can be at an angle of at most 40°, or at most 30°, or at most 15°, to the horizontal, e.g., substantially horizontal; in this case, the fins can for example be mounted on the spine and lie side-by-side in a substantially horizontal plane. Alternatively, the substantially rigid spine can be at an angle of at most 40°, or at most 30°, or at most 15°, to the vertical, e.g., substantially vertical; in this case, the fins can for example be mounted on the spine and lie one above the other in a substantially vertical plane, pivoting around a pitch axis (an axis perpendicular to the vertical axis and perpendicular to the forward motion axis). The swimmer may comprise springs or other elastic components which return the fins to a desired neutral position.

When the substantially rigid spine is at an angle of most 40°, or at most 30°, or at most 15°, to the vertical, e.g., is substantially vertical, the substantially rigid spine of the swimmer and the substantially rigid section of the tether can optionally be a single monolithic component, with the substantially rigid spine and a substantially rigid section optionally being substantially aligned. In this case, the swimmer can comprise an additional weight, which helps to maintain the swimmer in a desired, e.g., substantially vertical, orientation.

In one embodiment, the tether can for example consist essentially of a single substantially rigid section having one end secured to the substantially rigid spine of the swimmer and the other end secured to the float, for example through a joint as described in (1) above. In another embodiment, the tether can for example consist essentially of first and second substantially rigid sections; the first substantially rigid section having one end secured to the substantially rigid spine of the swimmer and the other end secured to the second substantially rigid section, for example through a joint as described in (1) above; and the second substantially rigid section having one end secured to the first substantially rigid section, and the other end secured to the float, for example through a joint as described in (1) above.

The swimmer can comprise a substantially rigid spine having fins secured thereto, and the substantially rigid spine is connected to a substantially rigid section of the tether through a joint, for example a joint that makes it possible for the substantially rigid spine and the substantially rigid section of the tether to be (i) in a first operating position in which the fins secured to the spine generate desired forces when the WPD is in operation in wave-bearing water, or (ii) in a second folded position. The operating position and the folded position, and the joint between the rigid section and the rigid spine can for example be as described above.

Communications and Control

Figure 9:
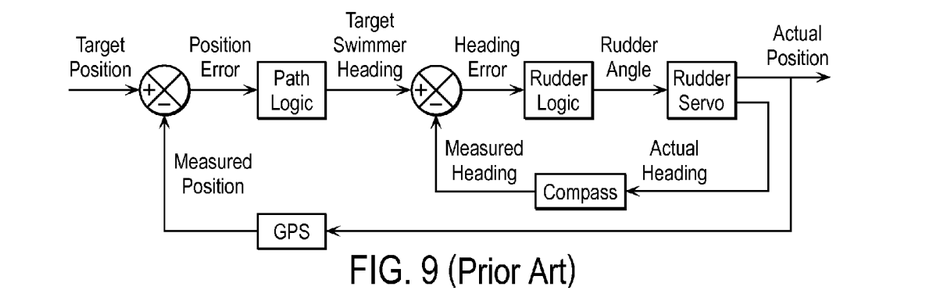
FIG. 9 is a is a block diagram of a control system of the type that might be used in any of the WPDs discussed herein for directing the WPD along a desired path.

FIG. 9 is a is a block diagram of a control system of the type that might be used in any of the WPDs discussed herein for directing the WPD along a desired path. This figure duplicates FIG. 5 in the above-referenced U.S. Pat. No. 7,371,136.

Figure 10:
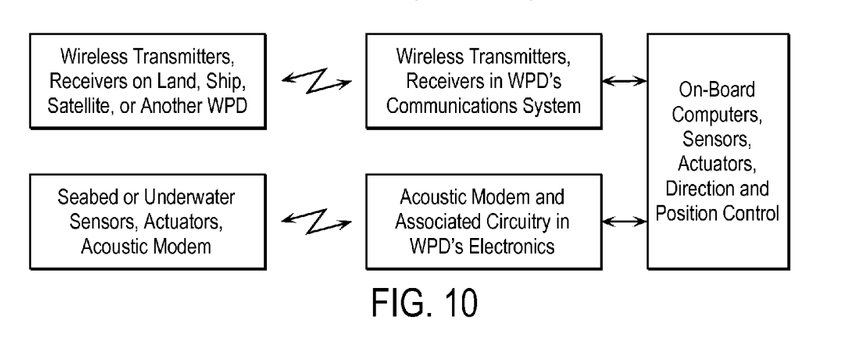
FIG. 10 is a block diagram schematically showing some of the ways that a representative WPD communicates with outside entities.

FIG. 10 is a block diagram schematically showing a representative WPD's on-board electronics and some of the ways that the representative WPD communicates with outside entities. As mentioned above, the WPD uses satellite location systems and radio to communicate data back to an operator and to receive navigation and other commands, and has on-board computers and sensors that allow it to navigate or hold position autonomously, without regular human interaction or control.

The float contains core electronics including: satellite position sensor (GPS), radio communications (preferably sat-comm such as Iridium), an orientation sensing means such as a magnetic compass, batteries, navigation controller that uses information from the GPS and compass to control the rudder and steer the vehicle. The float may also include solar panels and various payload electronics such as environmental sensors or observation equipment such as radio monitors, cameras, hydrophones. All core electronics may be housed in the same enclosure, preferably at the tail end of the float. By keeping all the core electronics together, there is no need for wet connectors or cables in the core system. This is great reliability benefit. (solar panels and winches will connect with wet connectors—solar can be redundant so one connector can fail without taking the system down and winches are not necessary for basic functionality.) Since the GPS and sat-comm antennas are short, they will not shade the solar panels. Also the tail end is the least frequently submerged part of the float. (Submersion obscures the antennas.) however, as discussed above, with dual-tether embodiments, it is possible to house electronics and the like at the center of the float because the tether connections are near the end.

Terminology

The term "comprises" and grammatical equivalents (e.g., "includes" or "has") thereof are used herein to mean that other elements (i.e., components, ingredients, steps, etc.) are optionally present. For example, a water vehicle "comprising" (or "that comprises") components A, B, and C can contain only components A, B, and C, or can contain not only components A, B, and C but also one or more other components. The term "consisting essentially of" and grammatical equivalents thereof is used herein to mean that other elements may be present that do not materially alter the claimed invention. The term "at least" followed by a number is used herein to denote the start of a range beginning with that number (which may be a range having an upper limit or no upper limit, depending on the variable being defined). For example "at least 1" means 1 or more than 1, and "at least 80%" means 80% or more than 80%. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose lower limit is the first number and whose upper limit is the second number. For example, "from 5 to 15 feet" or "5-15 feet" means a range whose lower limit is 5 feet and whose upper limit is 15 feet. The terms "plural," "multiple," "plurality," and "multiplicity" are used herein to denote two or more than two items.

Where reference is made herein to a method comprising two or more defined steps, the defined steps can be carried out in any order or simultaneously (except where the context excludes that possibility), and the method can optionally include one or more other steps that are carried out before any of the defined steps, between two of the defined steps, or after all the defined steps (except where the context excludes that possibility). Where reference is made herein to "first" and "second" elements, this is generally done for identification purposes; unless the context requires otherwise, the first and second elements can be the same or different, and reference to a first element does not mean that a second element is necessarily present (though it may be present). Where reference is made herein to "a" or "an" element, this does not exclude the possibility that there are two or more such elements (except where the context excludes that possibility). Where reference is made herein to two or more elements, this does not exclude the possibility that the two or more elements are replaced by a lesser number or greater number of elements providing the same function (except where the context excludes that possibility). The numbers given herein should be construed with the latitude appropriate to their context and expression; for example, each number is subject to variation that depends on the accuracy with which it can be measured by methods conventionally used by those skilled in the art.

Unless otherwise noted, the references to the positioning and shape of a component of the vehicle refer to that positioning and shape when the vehicle is in still water. The terms listed below are used in this specification in accordance with the definitions given below.

"Leading edge" (or leading end) and "trailing edge" (or trailing end) denote the front and rear surfaces respectively of a fin or other component as wave power causes the vehicle to move forward.

"Fore" and "aft" denote locations relatively near the leading and trailing edges (or ends) respectively.

"Aligned" denotes a direction that lies generally in a vertical plane that is parallel to the vertical plane that includes the axial centerline of the swimmer. "Axially aligned" denotes a direction that lies generally in the vertical plane that includes the axial centerline of the swimmer.

"Transverse" denotes a direction that lies generally in a vertical plane orthogonal to the vertical plane that includes the axial centerline of the swimmer.

Where reference is made herein to a feature that "generally" complies with a particular definition, for example "generally in a vertical plane," "generally laminar," or "generally horizontal," it is to be understood that the feature need not comply strictly with that particular definition, but rather can depart from that strict definition by an amount that permits effective operation in accordance with the principles of the invention.

CONCLUSION

In conclusion, it can be seen that the use of rigid tethers in embodiments of the present invention can address and overcome the problems and can provide advantages.

In the Summary of the Invention and the Description of Specific Embodiments above, and the accompanying drawings, reference is made to particular features of the invention. It is to be understood that the disclosure of the invention in this specification includes all possible combinations of such particular features. For example, where a particular feature is disclosed in the context of a particular aspect, a particular embodiment, or a particular figure, that feature can also be used, to the extent appropriate, in the context of other particular aspects, embodiments, and figures, and in the invention generally. It is also to be understood that this invention includes all novel features disclosed herein and is not limited to the specific aspects or embodiments of the invention set out above.

While the above is a complete description of specific embodiments of the invention, the above description should not be taken as limiting the scope of the invention as defined by the claims.

What is claimed is:

1. A nautical device comprising:
   (1) a float;
   (2) a wave-actuated component; and
   (3) a tether that connects the float to the wave actuated component, wherein the tether includes first and second rigid sections that are configured to move relative to one another so as to transform between
   (a) an adjacent position in which at least part of the tether is close to the float, and
   (b) an extended position in which the tether is extended below the float,
   wherein the float, the tether, and the wave-actuated component are configured such that when the nautical device is in wave-bearing water with the float on or near the surface of the water and the tether submerged in the extended position below the float, the wave-actuated component interacts with the water to generate forces that are transmitted to the tether so as to propel the nautical device horizontally through the water.

2. The nautical device of claim 1 wherein:
   the tether is in the extended position; and
   the nautical device is an autonomous wave-powered device.

3. The nautical device of claim 1 wherein the first rigid section is hinged to the second rigid section.

4. The nautical device of claim 1 wherein the tether comprises sections that: are configured to slide relative to each other such that the tether can be moved from the adjacent position to the extended position.

5. A nautical device comprising:
   a float;
   a wave-actuated component; and
   a tether that is secured to the float;
   wherein:
   (1) the tether comprises a first rigid section having first and second ends, and a second rigid section having first and second ends;
   (2) the first and second rigid sections are secured to each other through a joint at their respective first ends; and
   (3) the first rigid section, at its second end, is secured to the float;
   (4) the second rigid section, at its second end, is secured to the wave-actuated component;
   wherein the tether is configured to transform between:
   an adjacent position in which the first and second rigid sections of the tether are folded together at the joint and are disposed close to the float, and
   an extended position in which the first and second rigid sections of the tether extend away from each other at the joint and extend below and away from the float;
   wherein the wave-activated component comprises:
   an elongate rigid member that is connected to the second end of the second rigid section of the tether such that the elongate rigid member and the second rigid section can be positioned to be substantially collinear; and
   a plurality of fins disposed along the elongate rigid member;

wherein the float, the tether, and the wave-actuated component are configured such that when the nautical device is in wave-bearing water with the float on or near the surface of the water and the tether submerged in the extended position below the float, the wave-actuated component interacts with the water to generate forces that are transmitted to the tether so as to propel the nautical device horizontally through the water.

6. A nautical device comprising:
(1) a float;
(2) a tether that is secured to the float; and
(3) a wave-actuated component that is secured to the tether; wherein:
the tether comprises two substantially rigid sections that are secured to each other through a joint such that the sections can transform between:
(a) an extended position in which the two sections are substantially aligned, with both sections lying in a first plane that is substantially vertical and includes the longitudinal axis of the float, and a second plane that is orthogonal to the first plane and is at an angle of at most 30° to the vertical: and
(b) a folded position in which both sections are close to the float; wherein the float, the tether, and the wave-actuated component are configured such that when the nautical device is in wave-bearing water with the float on or near the surface of the water and the tether submerged in the extended position below the float, the wave-actuated component interacts with the water to generate forces that are transmitted to the tether so as to propel the nautical device horizontally through the water.

7. The nautical device of claim 1 wherein the wave-actuated component comprises a plurality of fins that extends from the tether.

8. The nautical device of claim 1 wherein the wave-actuated component comprises at least one substantially rigid spine having fins secured thereto, and the substantially rigid spine is connected directly or indirectly to the tether.

9. The nautical device of claim 8 wherein the wave-actuated component has a single substantially rigid spine, with fins extending on each side of the rigid spine and the rigid spine, when the nautical device is in still water and the tether is in the extended position, the rigid spine is at an angle of at most 40° to the horizontal, and lies in a vertical plane that passes through the longitudinal axis of the float.

10. The nautical device of claim 9 configured such that when the nautical device is in still water, the fins lie side-by-side in a plane that is at an angle of at most 30° to the horizontal.

11. The nautical device of claim 8 configured such that when the nautical device is in still water, the substantially rigid spine is at an angle of at most 40° to the vertical.

12. The nautical device of claim 11 wherein the fins are mounted on the spine, and configured such that when the nautical device is in still water and the tether is in the extended position, the fins lie one above the other, with each of the fins lying in a plane that is at an angle of at most 60° to the horizontal.

13. A fin system configured for tethering below a float in a nautical device so as to harvest wave power in a manner that propels the nautical device through the water, the fin system comprising:
(a) a plurality of fins that are configured to rotate about an axis from a neutral position, and
(b) a control system configured to control rotation of the fin about the axis, the control system comprising:
a first means that controls the rotation of the fin about the axis within a defined range of positions about the neutral position; and
a second means that controls the rotation of the fin about the axis outside the defined range, wherein the second means makes it more difficult for the fin to rotate outside the range than it is for the fin to rotate within the range.

14. The fin system of claim 13 wherein the rotation within the range is controlled solely by the first means.

15. The fin system of claim 13 wherein the rotation within the range is controlled both by the first means and by the second means.

16. The fin system of claim 13 wherein the rotation outside the range is controlled solely by the second means.

17. The fin system of claim 13 wherein the rotation outside the range is controlled both by the first means and by the second means.

18. The nautical device of claim 1 comprising two tethers that are each secured at its proximal end to the same or different positions on the float, at least one of the tethers being movable between a first position in which the distal end of the tether is close to the float and a second position in which the distal end of the tether is below and away from the float.

19. The nautical device of claim 18 wherein:
(a) one of the two tethers is secured to the fore section of the float and the other is secured to the aft section of the float;
(b) the wave-actuated component comprises a substantially rigid spine having fins attached thereto;
(c) one of the tethers is secured to the wave-actuated component close to the front of the wave-actuated component, and the other tether is secured to the wave-actuated component close to the back of the wave-actuated component; and
(d) when both the tethers are in the extended position and the: device is in still water, the substantially rigid spine (i) lies in a vertical plane that includes the longitudinal axis of the float, and (ii) is at an angle of at most 40° to the horizontal.

20. The nautical device of claim 1 wherein the tether, or at least one of the tethers when there are multiple tethers, has one or more of the following characteristics:
(1) it has a streamlined cross-section;
(2) it is constructed of one or more materials selected from carbon-fiber-reinforced polymeric composites, fiberglass-reinforced polymeric composites, titanium, aluminum, stainless steel, or steel treated with a corrosion inhibitor;
(3) it includes a channel that extends from one end of the tether to the other and that contains electrical and/or communication cables that operably connect components in the float and the wave-actuated component;
(4) it comprises a single rigid section having a length of 3-30 feet (1-10 m), or two or more rigid sections that can be folded together, and which together have a length of 3-30 feet (1-10 m).

21. The nautical device of claim 1, further comprising:
(1) wireless communications equipment;
(2) a computer system;
(3) a satellite-referenced position sensor;
(4) a horizontal direction sensor that senses direction in a horizontal plane; and
(5) a steering actuator;
wherein the computer system
(a) is linked to the communications equipment, the position sensor, the horizontal
sensor and the steering actuator, and (b) is programmed to control the steering actuator in response to signals received from the communications equipment, or from the position sensor and the horizontal direction sensor, or from signals received from another sensor on the vehicle.

22. A method of launching a nautical device according to claim 1, the method comprising:
   (A) placing the float in the water with the tether: in the adjacent position, and
   (B) moving the tether from the adjacent position to the extended position while the float is above the water or after the float has been placed in the water.

23. A method of recovering a nautical device according to claim 1 from water in which it is floating with the tether in the extended position, the method comprising
   (A) moving the tether from the extended position to the adjacent position, and
   (B) removing the nautical device from the water.

24. A method of obtaining information, the method comprising receiving signals comprising the information from, or recorded by, the nautical device of claim 1.

25. A method for controlling operation of the nautical device of claim 1, the method comprising sending signals to the nautical device that instruct the nautical device as to its operation.

26. The fin system of claim 13 wherein:
the first means includes a first spring;
the second means includes a second spring;
the rotation of the fin about the axis is primarily controlled by the first spring when the movement of the fin is within the defined range; and
the rotation is primarily controlled by the second spring when the rotation of the fin about the axis is outside the range, the second spring being stiffer than the first spring, thus making it more difficult for the fin to rotate outside the range.

27. The nautical device of claim 8 wherein the wave-actuated component has two substantially rigid spines, with fins extending between the rigid spines, and when the nautical device is in still water and the tether is in the extended position, both the rigid spines lie in a plane at an angle of at most 40° to the horizontal, and the rigid spines are equally spaced from a vertical plane that passes through the longitudinal axis of the float.

28. The nautical device of claim 27 configured such that when the nautical device is in still water, the fins lie side-by-side in a plane that is at an angle of at most 30° to the horizontal.

* * * * *